(12) United States Patent
Gallagher et al.

(10) Patent No.: US 7,035,460 B2
(45) Date of Patent: Apr. 25, 2006

(54) METHOD FOR CONSTRUCTING AN EXTENDED COLOR GAMUT DIGITAL IMAGE FROM A LIMITED COLOR GAMUT DIGITAL IMAGE

(75) Inventors: Andrew C. Gallagher, Brockport, NY (US); Edward B. Gindele, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 622 days.

(21) Appl. No.: 10/161,117

(22) Filed: May 31, 2002

(65) Prior Publication Data

US 2003/0223634 A1    Dec. 4, 2003

(51) Int. Cl.
*G06K 9/00* (2006.01)
*G06F 13/00* (2006.01)

(52) U.S. Cl. ...................................... 382/167; 345/590
(58) Field of Classification Search ................ 382/154, 382/162, 165, 166, 167, 275; 358/1.9, 501, 358/505, 512, 518, 520; 345/101, 589, 590, 345/592, 601, 602; 348/552
See application file for complete search history.

(56) References Cited

U.S. PATENT DOCUMENTS

| | | | |
|---|---|---|---|
| 4,500,919 A | | 2/1985 | Schreiber |
| 5,081,529 A | | 1/1992 | Collette |
| 5,134,573 A | | 7/1992 | Goodwin |
| 5,289,295 A | * | 2/1994 | Yumiba et al. ............. 358/518 |
| 5,459,589 A | * | 10/1995 | Ohnishi et al. ............. 358/518 |
| 5,539,540 A | | 7/1996 | Spaulding et al. |
| 5,583,666 A | | 12/1996 | Ellson et al. |
| 5,940,191 A | * | 8/1999 | Tsai ........................... 358/512 |
| 6,025,823 A | * | 2/2000 | Choi .......................... 345/101 |
| 6,285,784 B1 | | 9/2001 | Spaulding et al. |
| 6,297,800 B1 | * | 10/2001 | Dagman ..................... 345/601 |
| 6,335,983 B1 | * | 1/2002 | McCarthy et al. .......... 382/162 |
| 6,751,346 B1 | * | 6/2004 | Shimizu ..................... 382/162 |
| 6,879,348 B1 | * | 4/2005 | Niida .......................... 348/552 |
| 2003/0223634 A1 | * | 12/2003 | Gallagher et al. ........... 382/167 |
| 2003/0234944 A1 | * | 12/2003 | Gindele ...................... 358/1.9 |

FOREIGN PATENT DOCUMENTS

EP        0 488 656        6/1992

OTHER PUBLICATIONS

"A Standard Default Color Space For the Internet—sRGB" by Michael Stokes et al., Version 1.10, Nov. 5, 1996.

* cited by examiner

*Primary Examiner*—Andrew W. Johns
*Assistant Examiner*—Amir Alavi
(74) *Attorney, Agent, or Firm*—Raymond L. Owens (57) ABSTRACT

A method for constructing an extended color gamut digital image from a limited color gamut digital image which was derived from a first extended color gamut image includes providing a modified inverse color adjustment function which when such function operates on a limited color gamut digital image an extended color gamut digital image having reduced highlight color saturation for highlight color values when compared with corresponding color values of the first extended color gamut image is produced, and operating on the limited color gamut digital image with the modified inverse color adjustment function to construct the extended color gamut digital image with reduced color saturation for highlight color values that results in reduced levels of color contouring and quantization artifacts.

27 Claims, 10 Drawing Sheets

METHOD FOR CONSTRUCTING AN EXTENDED COLOR GAMUT DIGITAL IMAGE FROM A LIMITED COLOR GAMUT DIGITAL IMAGE

FIELD OF THE INVENTION

This invention relates to digital image processing and in particular to a method of constructing an extended color gamut digital image from a limited color gamut digital image.

BACKGROUND OF THE INVENTION

Digital images can be represented with a wide variety of color spaces and color encodings. The color gamut of an imaging system is the range of colors that can be represented or produced. An extended color gamut digital image has color values that are outside the limited color gamut of a storage color space. The process of mapping the colors of an extended color gamut digital image to the colors of a storage color space is often referred to as gamut mapping. Regardless of the gamut mapping strategy, there will always be a loss of information and/or a distortion of the color characteristics of the image.

Scene luminance dynamic range can be as large as 1000:1 or more, while most output devices (such as a video display or photographic print) cannot exceed a luminance dynamic range of 150:1 or so. A digital image made up of pixels having color values that represent scene color intensities is an extended color gamut digital image. By mapping the color values of such an image to the limited color gamut of an output device, a great deal of information is lost. For example, the gamut mapping procedure of mapping colors of an extended dynamic range digital image to the video "sRGB" color space generally discards a great deal of information, often due to the large difference in the luminance dynamic ranges. The process of using gamut mapping to map the colors of an extended color gamut digital image to the color gamut of a storage color space representing an output device (for example sRGB color space) is called rendering.

Rendered digital images (also called limited color gamut digital images) are generally very convenient for direct display on an output device. For example, limited color gamut digital images encoded in the sRGB color space look good on a video monitor. However, the information loss associated with the rendering process that was used to create the limited color gamut digital image makes it difficult to manipulate the image.

Rendered digital images can suffer from traditional photographic problems. These problems can be caused by things such as exposure error, colored illuminant, contrast variability, and the like. These problems are very difficult to fix with direct manipulation of the rendered digital image data. For example, the application of a linear function to the pixel values of a rendered image in the sRGB color space appears to modify the exposure, color saturation, and contrast of the image. Thus, it is difficult to correct or enhance a limited color gamut digital image.

However, the information in the extended color gamut digital image is useful for easily modifying the digital image. For example, when the colors of the extended color gamut digital image are related to the logarithm of the scene exposure, then exposure adjustments can be made simply by adding a constant to each color component value in the image. Contrast problems can often be corrected by applying a linear or nonlinear function to the image data.

Therefore, one method of applying modifications to a limited color gamut digital image includes the steps of:

a) creating a reconstructed extended color gamut digital image from the limited color gamut digital image;

b) enhancing the reconstructed extended color gamut digital image with an image modification step; and c) creating an enhanced limited color gamut digital image by rendering the modified reconstructed extended color gamut digital image.

Steps b) and c) are both commonly known in the art of image processing. Several authors have described methods to accomplish step a). A successful method of creating a reconstructed extended color gamut digital image from a limited color gamut digital image must overcome several obstacles. First, the rendering process used to create a limited color gamut digital image from an extended color gamut digital image involves a loss of information, as previously described. Second, it is common to represent the limited color gamut digital image with only 8 bits per color channel of each pixel. This quantization, coupled with the gamut mapping, makes it very difficult to accurately create a reconstructed extended color gamut digital image. The process of creating a reconstructed extended dynamic range digital image from a limited color gamut digital image is referred to as "derendering".

Spaulding et al. in U.S. Pat. No. 6,285,784 describe a method of applying manipulations to a limited color gamut digital image. In the described method, a limited color gamut digital image is combined with a residual image to form a reconstructed extended color gamut digital image. This reconstructed extended color gamut digital image is enhanced with modifications such as color balance adjustment or tone scale adjustment. Spaulding et al.'s method describes an effective method for applying a modification to a limited color gamut digital image by making an extended color gamut digital image. Unfortunately, Spaulding et al.'s method does not describe improving a limited color gamut digital image not having an associated residual image.

In U.S. Pat. No. 6,335,983, McCarthy et al. describe a derendering process by applying an inverse color adjustment function to a source digital image. This method can be used to generate an extended color gamut digital image from a limited color gamut digital image for the purpose of enhancing the image. The de-rendered image, the extended color gamut digital image, can then be improved with image modifications. However, their resulting image (the reconstructed extended color gamut digital image) can occasionally contain objectionable artifacts such as color contouring and quantization artifacts.

SUMMARY OF THE INVENTION

It is therefore an object of the present invention to provide an improved method of creating a reconstructed extended color gamut digital image from a limited color gamut digital image.

Still further, it is an object of the invention to provide an improved method of derendering a limited color gamut digital image.

These objects are achieved by a method for constructing an extended color gamut digital image from a limited color gamut digital image which was derived from a first extended color gamut image, comprising the steps of:

a) providing a modified inverse color adjustment function which when such function operates on a limited color gamut digital image an extended color gamut digital image having reduced highlight color saturation for highlight color values when compared with corresponding color values of the first extended color gamut image is produced; and b) operating on the limited color gamut digital image with the modified inverse color adjustment function to construct the extended color gamut digital image with reduced color saturation for highlight color values that results in reduced levels of color contouring and quantization artifacts.

ADVANTAGES

An advantage of the present invention is the use of a modified inverse color adjustment function which operates on a limited color gamut digital image to construct an extended color gamut digital image. This constructed extended color gamut digital image has reduced color saturation for highlight color values which facilitates reduction in color contouring and quantization artifacts.

DETAILED DESCRIPTION OF THE INVENTION

In the following description, a preferred embodiment of the present invention will be described as a software program. Those skilled in the art will readily recognize that the equivalent of such software may also be constructed in hardware. Because image processing algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein, may be selected from such systems, algorithms, components, and elements known in the art. Given the description as set forth in the following specification, all software implementation thereof as a computer program is conventional and within the ordinary skill in such arts.

Still further, as used herein, the computer program may be stored in a computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

A digital image is comprised of one or more pixels. Each pixel has an associated color value. The color value of a pixel may be indicated by one or more color component values. Typically, the color component values indicate intensities of red, green, and blue (although other numbers of color components values are possible). Taken together, the color component values describe the color value of the pixel. Each digital image channel is comprised of a two-dimensional array of pixels. For monochrome applications, a single color component value describes the color value of each pixel. Motion imaging applications can be thought of as a time sequence of digital images. Those skilled in the art will recognize that the present invention can be applied to, but is not limited to, a digital image channel for any of the above mentioned applications.

Figure 1:
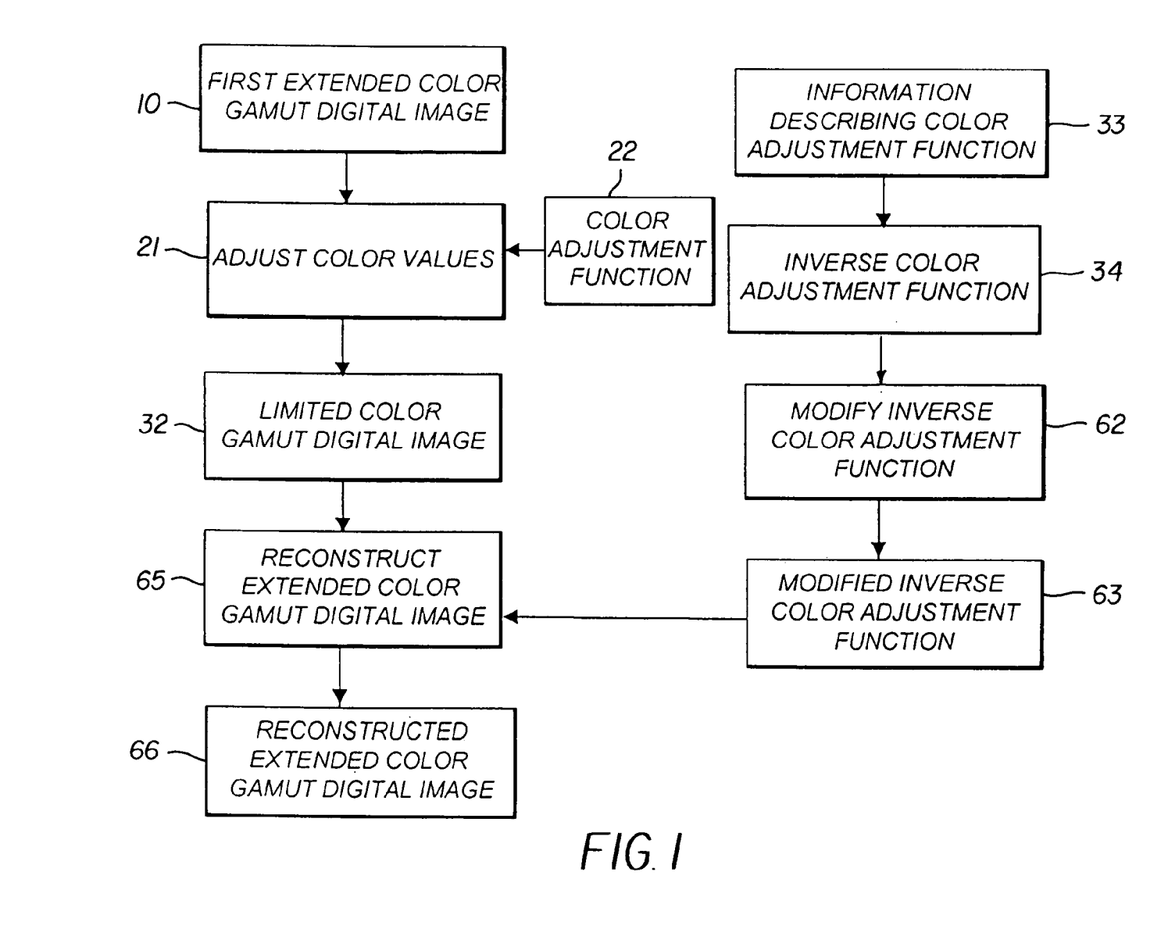
FIG. 1 is a functional block diagram showing the component parts of the present invention.

A preferred embodiment of the present invention is shown in FIG. 1. A first extended color gamut digital image 10 is input, along with a color adjustment function 22 to an adjust color values step 21. Step 21 will be described in more detail hereinbelow. The output of step 21 is a limited color gamut digital image 32.

A reconstructed extended color gamut digital image 66 is created from a limited color gamut digital image 32 using information describing the color adjustment function 33. Note that the information 33 preferably describes the color adjustment function 22 that was used by the adjust color values step 21 to generate the limited color gamut digital image 32. However, the present invention still achieves the desired result when the information 33 does not exactly correlate to the color adjustment function 22. This is important because the exact color adjustment function 22 is not always known by a system employing the described invention, but an approximate color adjustment function is often known. An inverse color adjustment function 34 is created from the information 33. A modify inverse color adjustment function step 62 is used to adjust the inverse color adjustment function 34 to reduce the severity and frequency of artifacts (as judged by a human visual inspection) resulting from quantization and gamut compression in the reconstructed extended color gamut digital image 66. A reconstruct extended color gamut digital image step 65 is used with inputs of a limited color gamut digital image 32 and the modified inverse color adjustment function 63 to create the reconstructed extended color gamut digital image 66.

Note that a digital camera can capture the first extended color gamut digital image 10, and perform the adjust color values step 21 according to the color adjustment function 22 within the camera hardware. Many digital cameras output an sRGB color space digital image, which is a limited color gamut digital image. In addition, the first extended color gamut digital image 10 can be derived by scaling a photographic film, such as a print film or a transparency film. Note that the film itself can be an extended color gamut image.

Figure 2:
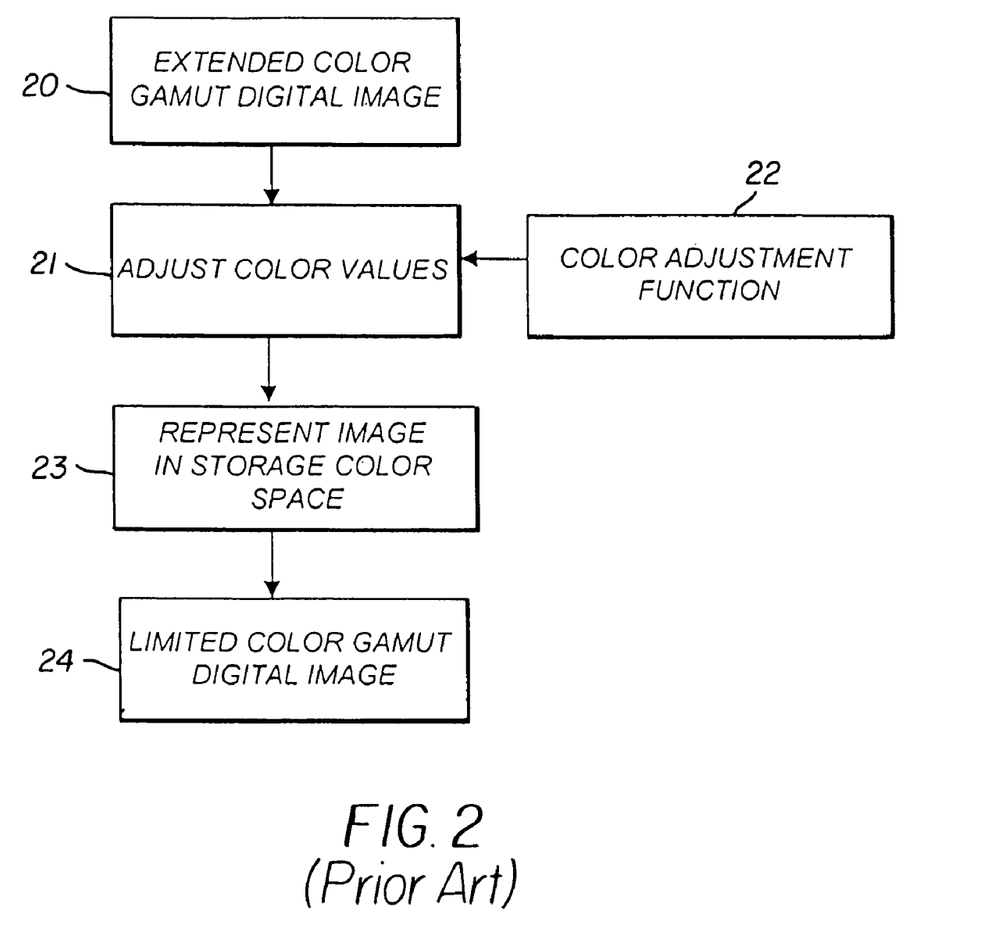
FIG. 2 is a block diagram showing a prior art method of generating a limited color gamut digital image from an extended color gamut digital image.

To fully appreciate the present invention shown in FIG. 1, a prior art method for generating a limited color gamut digital image 24 is shown in FIG. 2 (see U.S. Pat. No. 6,335,983). An extended color gamut digital image 20 has color values that are outside the limited color gamut of a storage color space. An adjust color values step 21 is used to limit the color values to those that will fit within the limited color gamut of the storage color space using a color adjustment function 22. Next, a represent image in storage color space step 23 is used to form a limited color gamut digital image 24.

The color gamut of an imaging system is the range of colors that can be represented or produced. An out-of-gamut color is a color that cannot be produced or represented in that imaging system. The color gamut of the storage color space will often be smaller than, or at least different from, the original color gamut of the extended color gamut digital image 20. As a result, there generally will be colors in the extended color gamut digital image 20 that cannot be represented in the storage color space, for example, in the case where the extended color gamut digital image 20 is a scan of a photographic negative having a luminance dynamic range of 1000:1. A typical storage color space such as a video RGB color space (e.g., sRGB color space) has a luminance dynamic range of less than 150:1.

Therefore, color values for the out-of-gamut colors (color values of the extended color gamut digital image 20 that are not in the gamut of the storage color space) must somehow be modified in order to store the color values in the storage color space. In prior art methods, contouring and quantization artifacts can occur when attempting to recover the original extended color gamut color values. A contouring artifact refers to the visual impression that an imaging system has discrete "steps" between different color values. For example, an object in the image that should appear as a gradual contour from one color value to a different color value instead appears as a series of steps between the color values. A quantization artifact refers to the visual impression that color values intermediate to other color values are missing from a digital image. Contouring and quantization artifacts are often closely related, and can occur within the same spatial region of a digital image. These artifacts generally reduce the quality of an image. In the present invention, these artifacts are reduced in magnitude and frequency. Essentially, this is accomplished by the present invention by reducing the color saturation of those color values (generally highlight color values) that would likely produce artifacts. Highlight color values relate to the lighter color values in a digital image. Preferably, in reference to an 8-bit sRGB digital image (a limited color gamut digital image), the highlight color values are those color values having an average color component value of 240 or above. Alternatively, the highlight color values are those color values having an average color component value of 0.8 or above when the color values relate to linear exposure.

The adjust color values step 21 is used to adjust the color values of the extended color gamut digital image to fit within the limited color gamut of the storage color space, forming adjusted color values. In this step, out-of-gamut colors in the extended color gamut digital image are modified to be within the limited color gamut. It is preferable to use a color adjustment function that is substantially invertible. For example, a gamut compression strategy such as described in U.S. Pat. Nos. 5,539,540 and 5,583,666 could be used.

The extended color gamut can have a larger luminance dynamic range than can be represented in the limited color gamut. In this case, one aspect of the implementation of the adjust color values step 21 is typically the application of a tone scale function. The tone scale function might be applied to the luminance channel of the image, or alternatively to each color channel of a color digital image representation. Specific examples of color adjustment functions can be found in U.S. Pat. Nos. 5,539,540; 5,583,666; and 6,335,983.

The color adjustment function 22 can be implemented in many different ways. In some cases, it might be applied as a set of simple mathematical transformations, such as scale factors, etc. In other cases it might be implemented with a polynomial function or set of one-dimensional look-up-tables or matrix operations, or a multi-dimensional look-up-table, (such as described in U.S. Pat. No. 4,500,919) or a combination thereof.

Once the adjusted color values have been determined, the next step is to represent the adjusted color values in the storage color space indicated by step 23. The output of step 23 is a limited color gamut digital image 24.

As shown in FIG. 1, the present invention creates a reconstructed extended color gamut digital image 66. There are two goals that guide the creation of the reconstructed extended color gamut digital image 66. The first goal is that the color values of pixels of the reconstructed extended color gamut digital image 66 should be as close as possible to the first extended color gamut digital image 10. The second goal is that the reconstructed extended color gamut digital image 66 should be as free from color contouring and quantization artifacts as possible. These goals conflict sometimes. For example, a reduction in artifacts may only be achievable by increasing the average color value differences between the first extended color gamut digital image 66 and the reconstructed color gamut digital image 10. The reduction in artifacts is generally achieved by limiting the gradients within the inverse color adjustment function 34 with the step 62, resulting in the modified inverse color adjustment function 63. In the preferred embodiment, the limitation of the gradient in the modified inverse color adjustment function 63 results in reduced color saturation for highlight color values in the reconstructed extended color gamut digital image 66 relative to the saturation of color values of corresponding pixels in the first extended color gamut digital image 10. However, the color saturation for non-highlight color values in the reconstructed extended color gamut digital image 66 is similar (+ or −10%) to the color saturation of color values of corresponding pixels in the first extended color gamut digital image 10.

Knowledge of the color adjustment function 22 is used to create a reconstructed extended color gamut digital image 66 from a limited color gamut digital image 32. As shown in FIG. 1, information describing the color adjustment function 33 is used to generate an inverse color adjustment function 34.

There are many different types of information that can be used to describe the color adjustment function 22. For example, a multi-dimensional look-up-table can be used to describe the color adjustment function 22. In this case, the nodes of the multi-dimensional look-up-table would store the adjusted limited color gamut color values for a lattice of original extended color gamut color values. Conversely, the multi-dimensional look-up-table can be used to store the inverse transformation. In this case, the nodes of the multi-dimensional look-up-table would store the original extended color gamut color values for a lattice of limited color gamut color values.

In some cases, the information 33 is a set of parameters. For example, the parameters might include a set of matrix coefficients. In addition, the coefficients of a polynomial may also be included among the parameters.

For some applications, there can be a limited number of standard color adjustment functions 22 that can be used. In this case, rather than storing the actual color adjustment function 22, it might be preferable to store an identifier to indicate which color adjustment function from a set of standard color adjustment functions 22 were used. In the case where the limited color gamut digital image 24 is an sRGB digital image created by a digital camera, the information 33 may be determined from a database that contains the color adjustment function information 33 for each make and model of digital camera, or from some other identifier associated with the limited color gamut digital image 24.

Further, a human operator could supply the information 33.

If the limited color gamut digital image 32 has no associated information 33, then the information 33 can be supplied as a system default. For example, if a limited color gamut digital image 32 from an unknown digital camera is input to the step 65, then the information 33 describing a known color adjustment function 22 is used as a default. For instance, the information describing the color adjustment function 33 could describe the color adjustment function of U.S. Pat. No. 5,583,666 as a default.

It is important to realize that while it is preferable that the information 33 relates directly to the color adjustment function 22, the present invention can successfully generate a useful reconstructed extended color gamut digital image 66 even when the information 33 only approximately corresponds to the color adjustment function 22.

The limited color gamut digital image 32 is preferably a digital image encoded in the sRGB color space (defined at http://www.w3.org/Graphics/Color/sRGB.html). Widely available consumer digital cameras, such as the Kodak DX3900 Digital Camera, typically produce limited color gamut digital images in the sRGB color space. In addition, the limited color gamut digital image 32 could originate from a scan of a film, or a scan of a print.

The first extended color gamut digital image 10 and the reconstructed extended color gamut digital image 66 can take many forms. Preferably, the color values of the reconstructed extended color gamut digital image 66 represent colors values from the original scene. Preferably, the pixel values of the reconstructed extended color gamut digital image 66 are also related to the logarithm of the scene exposure. The reconstructed extended color gamut digital image 66 is capable of having color values that are outside of the limited color gamut of a storage color space. Preferably, the extended color gamut digital image is encoded with 12 bits per pixel per color component value.

The reconstruct step 65 is used to expand the color values of the limited color gamut digital image to fit within the extended color gamut, producing a reconstructed extended color gamut digital image 66. The expansion is governed by the modified inverse color adjustment function 63. Each color value of the image 66 is ideally as close as possible to the corresponding color value of the first extended color gamut digital image 10 of FIG. 1, with the added constraint that contouring and quantization artifacts are minimized.

The previously described information 33 is used to determine an inverse color adjustment function 34. Mathematical techniques exist for inverting functions and are known by those skilled in the art. The functional inverse function $f^{-1}$(x) of a function $f(x)$ is the function that minimizes a squared error between an initial domain value (x) and the result of applying the inverse function to the function, as given in the following equation:

$$\min_{f^{-1}(x)} \int_x [x - f^{-1}(f(x))]^2$$

Many mathematics texts present methods for inverting functions and matrices, both of which can be included within the color adjustment function 22. While the inverse color adjustment 34 preferably minimizes the squared error between the extended color gamut digital image 10 and the reconstructed extended color gamut digital image 66, the inverse color adjustment function 34 also contains very high gradients that can produce contouring and/or quantization artifacts in the reconstructed extended color gamut digital image 66.

A modify inverse color adjustment function step 62 is used to modify the inverse color adjustment function 34 in such a manner as to reduce the magnitude and frequency of visibly objectionable artifacts (such as contouring and/or quantization artifacts) in the reconstructed extended color gamut digital image 66. The output of the step 62 is a modified inverse color adjustment function 63 that is input to step 65 for producing a reconstructed extended color gamut digital image 66 from a limited color gamut digital image 32.

Color, in digital images, is often represented as a multi-dimensional vector of color component values. It is common for color to be represented as a three-dimensional vector, such as an sRGB color value. Thus, the color adjustment function 22 and the inverse color adjustment function 34 are generally multi-dimensional transformations. Step 62 can be thought of as a way to modify the multi-dimensional transformation inverse color adjustment function 34. Step 62 generally reduces or places a limitation on the local gradient of the inverse color adjustment function 34 in order to reduce the frequency and magnitude of artifacts in the reconstructed extended color gamut digital image 66.

If the inverse color adjustment function 34 includes a series of component functions (such as look-up-tables and matrices), then step 62 can modify any or all of the component functions to produce the modified inverse color adjustment function 63.

Figure 3:
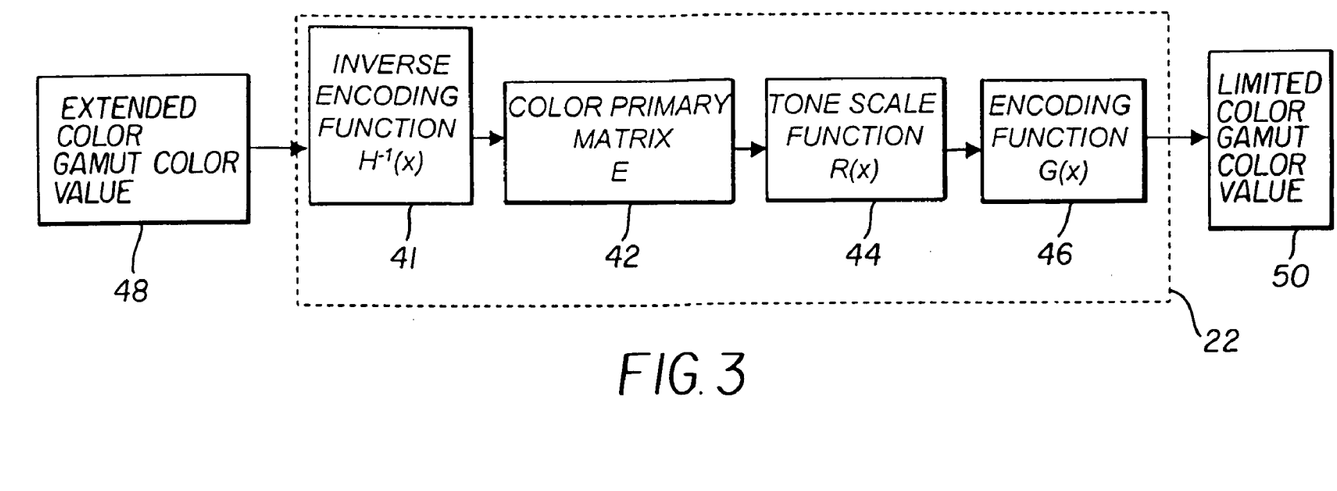
FIG. 3 is a block diagram of one embodiment of the color adjustment function 22 shown in FIG. 1.
Figure 4:
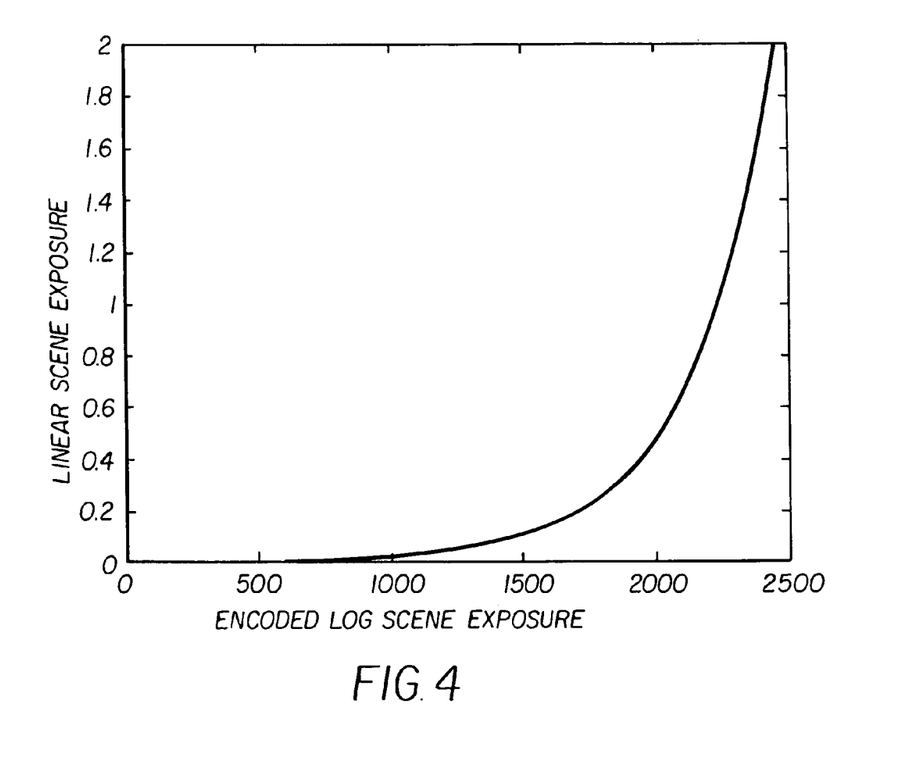
FIG. 4 is a preferred inverse encoding function $H^{-1}(x)$.

As an example, FIG. 3 shows a color adjustment function 22 including a series of component functions that determines a limited color gamut color values from extended color gamut color values. This color adjustment function 22 is used to create a limited color gamut digital image 24 as shown in FIG. 2 where the storage color space (i.e. the limited color gamut) is the sRGB color space. The color adjustment function 22 is applied to each color value of an extended color gamut color value 48, producing corresponding color values of the limited color gamut color value 50. The color adjustment function 22 includes each of the component functions in the specific order as shown. First, an inverse encoding function $H^{-1}(x)$ 41 is applied to the data to convert from the extended color gamut color values that are related to the log of scene exposure and encoded with 12 bits per color component value per pixel to color values that are linearly related to scene exposure. FIG. 4 illustrates the preferred inverse encoding function $H^{-1}(x)$. Referring back to FIG. 3, the next component function is a color primary matrix function E 42 that produces new color values by computing linear combinations of the original color values. The matrix E is preferably:

$$E = \begin{bmatrix} 2.05 & -0.79 & -0.26 \\ -0.21 & 1.25 & -0.04 \\ -0.02 & -0.14 & 1.16 \end{bmatrix}$$

Figure 5:
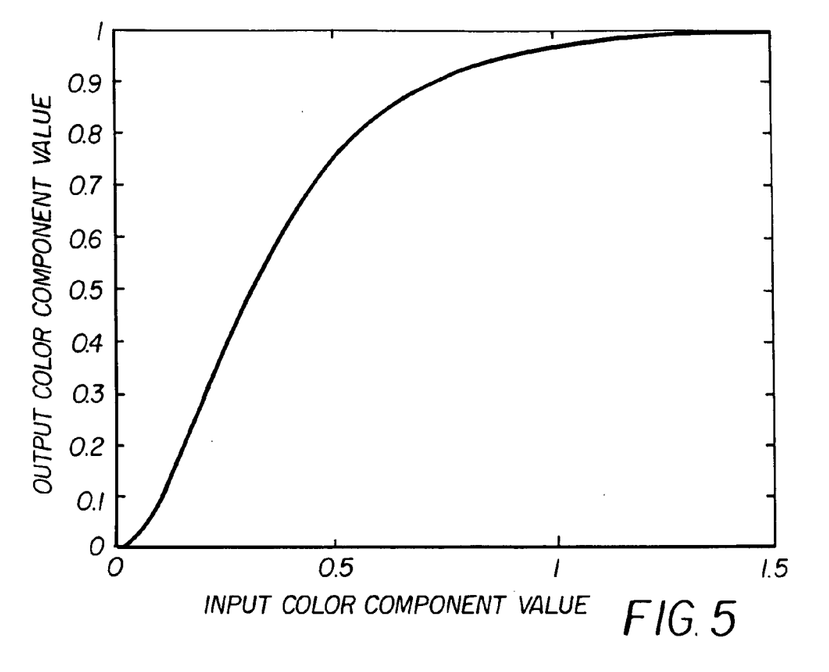
FIG. 5 is a preferred tone scale function $R(x)$.
Figure 6:
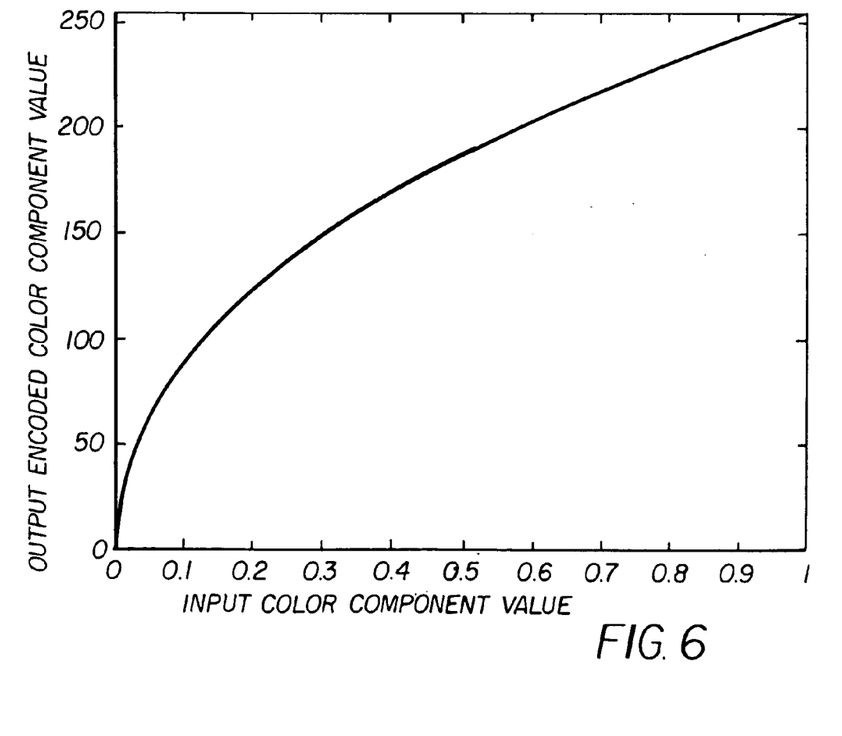
FIG. 6 is a preferred encoding function $G(x)$.

Next, the tone scale function R(x) 44 as previously described reduces the luminance dynamic range of the extended color gamut to more closely match that of the limited color gamut. FIG. 5 illustrates the preferred tone scale function, showing the preferred mapping from color values having the extended dynamic range of the extended color gamut to color values having a limited dynamic range of the limited color gamut. Finally, the encoding function G(x) 46 of FIG. 3 is used to properly distribute the color values for display on a video monitor. FIG. 6 illustrates the preferred encoding function G(x). Those skilled in the art will recognize that a multi-dimensional transformation exists that could be used as the color adjustment function 22 and produce equivalent limited color gamut digital image as with the FIG. 3 color adjustment function including several component functions.

Figure 7:
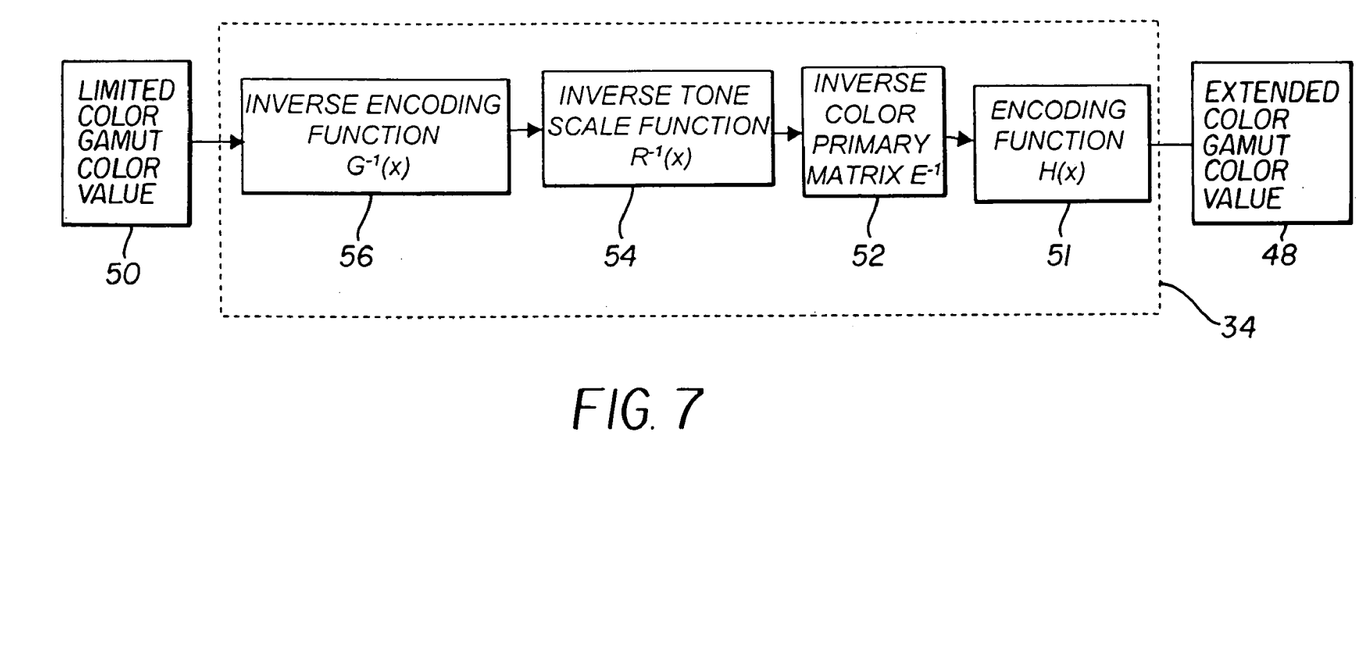
FIG. 7 is a block diagram of one embodiment of the inverse color adjustment function 34 shown in FIG. 1.
Figure 8A:
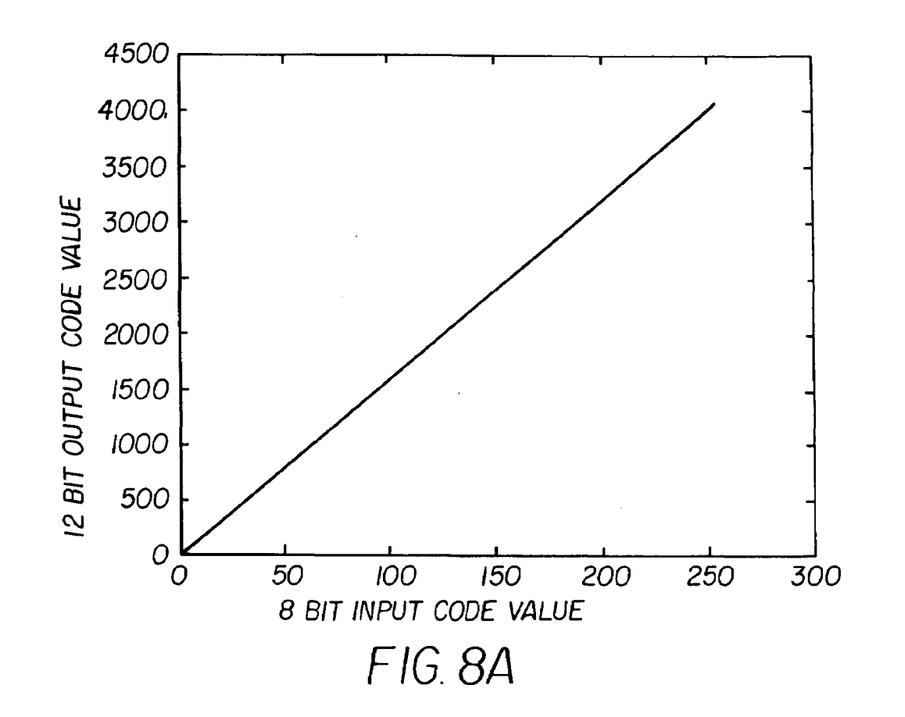
FIGS. 8A and 8B are plots of the two functions that make up the inverse encoding function $G^{-1}(x)$.
Figure 8B:
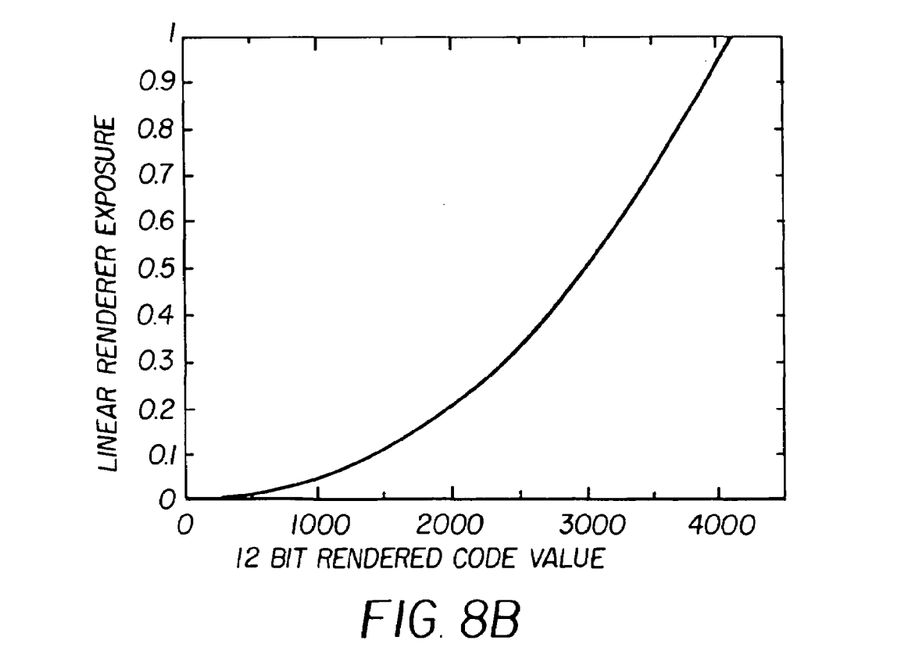

The color adjustment function 22, including the inverse encoding function $H^{-1}(x)$ 41, the color primary matrix function E 42, the tone scale function R(x) 44, and the encoding function G(x) 46 has a corresponding inverse color adjustment function 34, shown in FIG. 7. The inverse color adjustment function 34 is applied to each color value of an limited color gamut color value 50, producing corresponding extended color gamut color values 48. This inverse color adjustment function 34 is created by inverting the order of the component functions and inverting each of the component functions, as would be known to those skilled in the art of image processing. FIG. 7 shows that the component functions of the inverse color adjustment function include the inverse encoding function $G^{-1}(x)$ 56, the inverse tone scale function $R^{-1}(x)$ 54, the inverse color primary matrix function $E^{-1}$ 52, and the encoding function H(x) 51. The inverse of the encoding function $G^{-1}(x)$ 56 is broken up into two functions in the preferred embodiment. The first function, shown in FIG. 8A, is a linear function designed to increase the bit-depth of the limited color gamut digital image, which is typically encoded with 8 bits per color component per pixel. The bit-depth function shown in FIG. 8A increases that bit-depth from 8 to 12 bits per color component per pixel. A second function, plotted in FIG. 8B, shows the relationship between the output of the first function shown in FIG. 8A and linear rendered exposure values. These two function shown in FIGS. 8A and B, taken together, form the inverse encoding function $G^{-1}(x)$. If desired, the two functions can easily be cascaded to form a single function that represents the inverse encoding function $G^{-1}(x)$.

Figure 9:
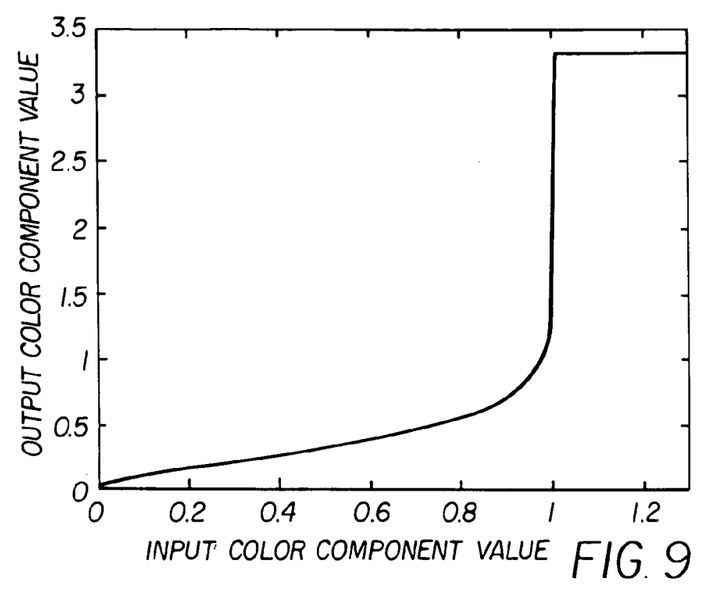
FIG. 9 is an inverse tone scale function $R^{-1}(x)$.

A plot of the inverse tone scale function $R^{-1}(x)$ referred to in FIG. 7 is shown in FIG. 9. Taking the inverse of a matrix is well known by those skilled in the art $$E^{-1} = \begin{bmatrix} 0.52 & 0.35 & 0.13 \\ 0.09 & 0.86 & 0.05 \\ 0.02 & 0.11 & 0.87 \end{bmatrix}.$$

Figure 10:
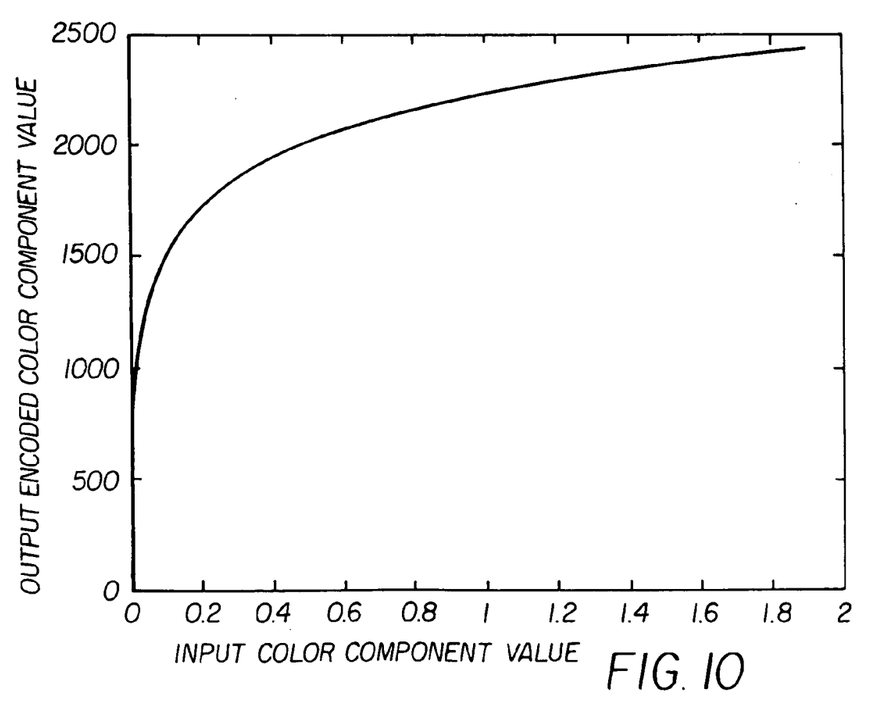
FIG. 10 is a preferred encoding function $H(x)$.

A plot of the encoding function H(x) referred to in FIG. 7 is shown in FIG. 10. The inverse color adjustment function 34 of FIG. 7, if applied to each color value of a limited color gamut digital image, would produce corresponding color values of a reconstructed extended color gamut digital image. Determining the color values of a reconstructed extended color gamut digital image with the aforementioned inverse color adjustment function 34 can produce color contouring and quantization artifacts. For that reason, in FIG. 1 the inverse color adjustment function 34 is modified with a modify inverse color adjustment function step 62 to produce a modified inverse color adjustment function 63. This modified inverse color adjustment function 63, if used to produce color values of a reconstructed extended color gamut digital image, is less likely to produce artifacts than the inverse color adjustment function 34. The nature and method of the modifications performed in the modify inverse color adjustment function step 62 is described below.

Figure 11:
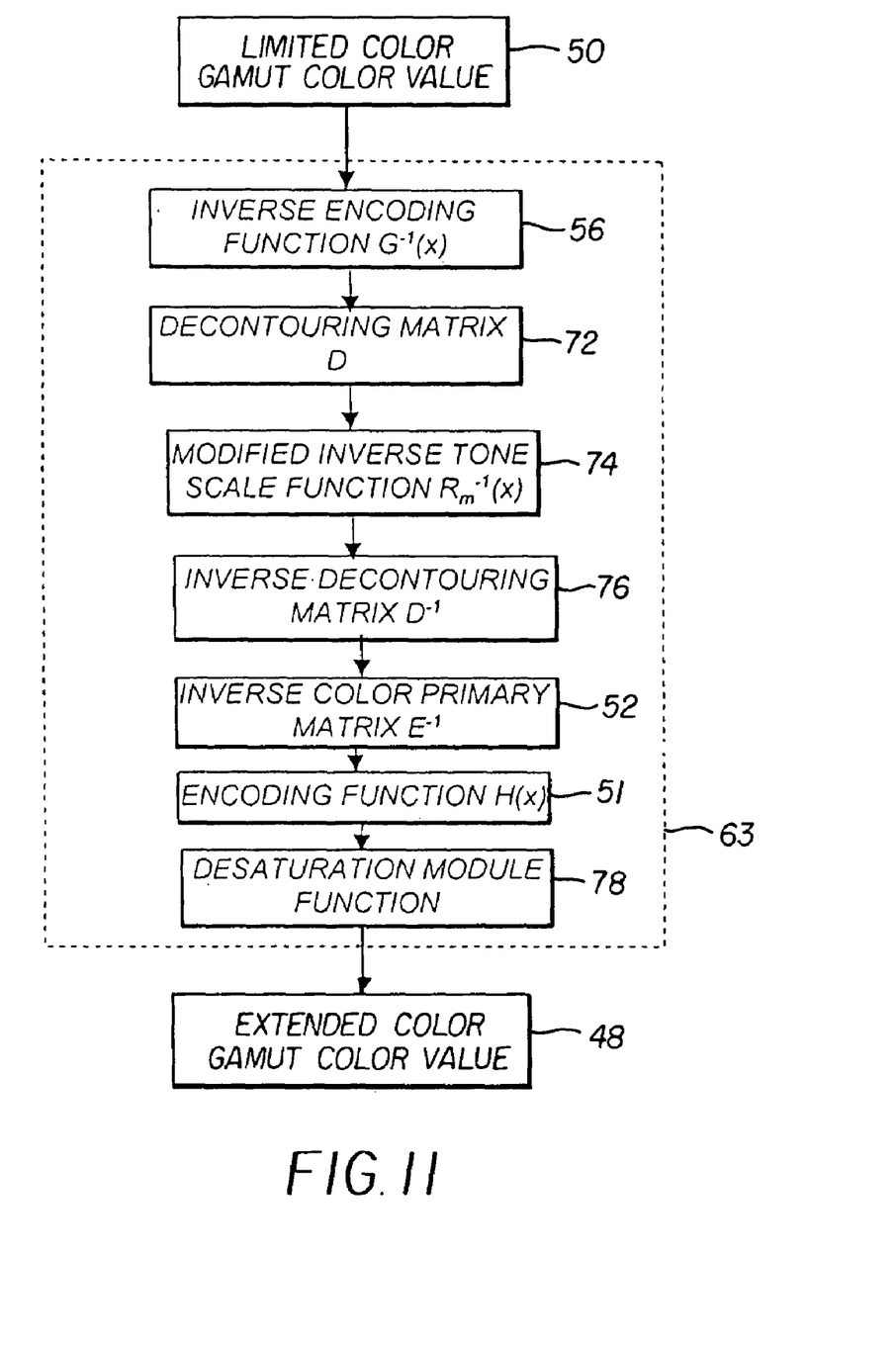
FIG. 11 is a block diagram of one embodiment of the modified inverse color adjustment function 63 shown in FIG. 1.

The preferable modified inverse color adjustment function 63 produced by the modify inverse color adjustment function step 62 is shown in FIG. 11. The modified inverse color adjustment function 63 is applied to each color value of an limited color gamut color value 50, producing corresponding extended color gamut color values 48 in such a manner that color contouring and quantization artifacts are minimized. The modified inverse color adjustment function 63 includes a series of component functions, several of which are exact matches to those of the inverse color adjustment function 34 shown in FIG. 7. The first component function is the inverse encoding function $G^{-1}(x)$ 56, already shown in FIGS. 8A and B. Intermediate pixel values output from the inverse encoding function $G^{-1}(x)$ range from 0 to 1.0 for each color component value, corresponding to a linear intensity of light. Those skilled in the art will recognize that the choice of the data range is arbitrary, and the present invention can easily be adapted to operate on color component values that have a different encoding, as would be apparent to those skilled in the art.

The next component function is the decontouring matrix function D72. The purpose of the decontouring matrix is to reduce the saturation of the color values that could appear as color contouring or quantization artifacts. The application of matrix D serves to prevent contouring and quantization artifacts, as higher saturation color values have a higher probability of appearing as quantization or contouring artifacts in the subsequent component functions of the modified inverse color adjustment function 63. Preferably, the decontouring matrix is a 3×3 matrix having the following form:

$$D = \begin{bmatrix} d & r(1-d) & (1-r)(1-d) \\ 0.5(1-d) & d & 0.5(1-d) \\ (1-r)(1-d) & r(1-d) & d \end{bmatrix}$$

where d ranges from 0.4 to 1.0 and is preferably 0.7. Parameter r ranges from 0 to 1.0 and is preferably ⅝. The decontouring matrix D is preferably applied to a color value described by a red, green, and blue, component coefficient, with the following equation.

$$c_{new} = D*c$$

where $c_{new}$ represents the color component values resulting from the application of the decontouring matrix function D 72 to the original color component values.

c preferably is a column vector of the red, green, and blue color component values.

$$c = \begin{bmatrix} r \\ g \\ b \end{bmatrix}$$

where r, g, and b represent the red, green, and blue color component values.

It is well known how to apply a 3×3 matrix to modify a color value by those skilled in the art of image processing. For color values having no saturation component (i.e. neutral color values where all color component values are equal) the matrix D has no effect.

Preferably, the decontouring matrix D 72 is applied to only those color values that are likely to produce color contouring or other artifacts. This is accomplished by making the value d of the decontouring matrix D 72 dependent on the color value of each pixel, thereby selecting a specific decontouring matrix D for each pixel's color value. The value d is a function of the average a of the color component values that represent the color value. The average a ranges from 0 (for a black color value) to 1.0 (for a white color value). The specific value of d used to create the decontouring matrix D 72 for the color value of a specific pixel is $d_{new}$, calculated with the following equations:

$d_{new}=1$ when $a<=T_1$ $d_{new}=(1-d)*(a-T_1)/(T_1-T_2)+d$ when $T_1<a<T_2$ $d_{new}=d$ when $a>=T_2$ where $T_1$ and $T_2$ are thresholds that are preferably set to 0.42 and 0.78, respectively.

Figure 12:
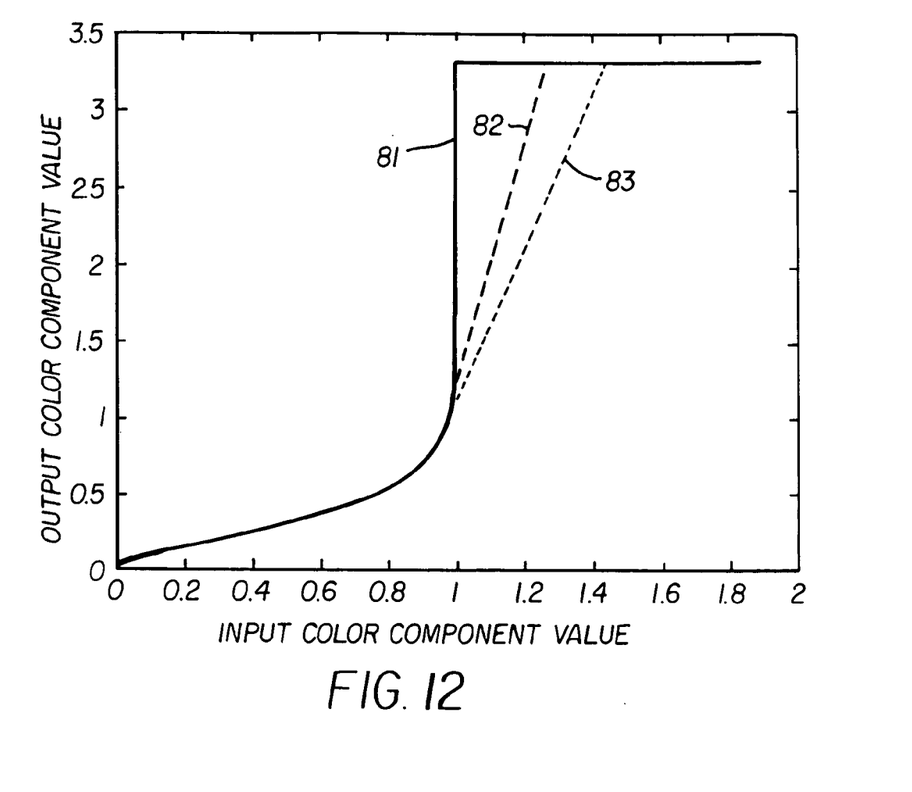
FIG. 12 shows an inverse tone scale function $R^{-1}(x)$ and two modified inverse tone scale functions $R_m^{-1}(x)$.

The next component function is the modified inverse tone scale function $R_m^{-1}(x)$ 74. The modified inverse tone scale function $R_m^{-1}(x)$ 74 is a modified version of the inverse tone scale function $R^{-1}(x)$ 54. The modification includes a limitation on the derivative (slope) of the inverse tone scale function 54. FIG. 12 shows a plot of the inverse tone scale function 54 (solid line 81), and two versions of the modified inverse tone scale function 74, created with two different slope limits. The dashed line 82 represents a modified inverse tone scale function created with a slope limit of 8, and the dotted line 83 represents a modified inverse tone scale function created with a slope limit of 5. The preferred slope limit is 8. Applying a slope limit to a function is well known in the art of image processing as, for example, is described by Goodwin in U.S. Pat. No. 5,134,573. The purpose of the modification of the inverse tone scale function is to limit the gain of the inverse tone scale function, thereby reducing the frequency and magnitude of contouring or quantization artifacts. Limiting the slope of the modified inverse tone scale function reduces the artifacts by decreasing the color saturation in the highlights of the reconstructed extended color gamut digital image 66 relative to that of the first extended color gamut digital image 10. By de-saturating the color values with the decontouring matrix function 72 prior to the modified inverse tone scale function 74, the contouring and quantization artifact occurrence are further reduced. Those skilled in the art will recognize that other modifications can be applied to the inverse tone scale function $R^{-1}(x)$ 54 to create the modified inverse tone scale function $R^{-1}(x)$ 74.

Referring back to FIG. 11, the next component function is the inverse of the decontouring matrix D 76. Inverting a 3×3 matrix is well known in the art and will not be further described. The purpose of the inverse of the decontouring matrix is to restore the color saturation of color values. For color values passing through a linear or nearly linear portion of the inverse tone scale function, the decontouring matrix and its inverse has no or very little effect. For color values passing through nonlinear portions of the inverse tone scale function, the decontouring matrix de-saturates the color value (i.e. reduces the range of the different color components of the color value). As a result, a narrower portion of the inverse tone scale function (having a lower average slope) affects the color value. The lower slope therefore is less likely to produce color contouring or quantization artifacts when applied to the color value.

The next component function is an inverse color primary matrix $E^{-1}$ 52. The purpose of the inverse color primary matrix is to change the primaries of the color representation. This component function is identical to the similar function in the inverse color adjustment function previously described in reference to FIG. 7.

Referring again to FIG. 11, the next component function is the extended color gamut encoding function H(x) 51 that essentially spaces the code values of the extended color gamut digital image 66 such that they are proportional to the log of scene exposure. A plot of the preferred H(x) is shown in FIG. 10.

The final component function is a desaturation function 78. The desaturation function 78 has the purpose of reducing the color saturation of those pixels that may contain color contouring or quantization artifacts. Contouring is more objectionable when it also involves changes in color. For example, a noticeable contour step from white to gray is less objectionable than a contour step from white to yellow-gray. The desaturation function 78 partially de-saturates those pixels that are likely to exhibit color contouring. The operation of the desaturation function 78 is as follows. A desaturation coefficient s is determined for the color value of each pixel of the image. The application of the desaturation coefficient s to the color value is performed as follows. A saturation component is determined for the color value. The saturation component is multiplied by the saturation coefficient s. Those skilled in the art will recognize that the saturation of a color value can be modified by a scale factor (the desaturation coefficient) in a number of different ways. Preferably, a neutral component is determined for the color value according to the following equation:

$$neu = \sum_{i=1}^{P} a_i c_i$$

where P is the number of color component values that represent the color value, $a_i$ is the weighting coefficient for the $i^{th}$ color component. Preferably, $$\sum_{i=1}^{P} a_i = 1.$$

$c_i$ is the value of the $i^{th}$ color component.

In the preferred case where a color value's color components are red, green, and blue components, the preferable equation for forming the neutral component is neu=0.4 red+0.5 green+0.1 blue where red, green, and blue represent the color component values of the color value.

Next, the new color value components are calculated according to the equation, which multiplies by the desaturation coefficient s each difference between the neutral component and the respective color value difference:

$$c_i' = neu + s(c_i - neu) \text{ for } 1 <= i <= N$$

where $c_i'$ is the new color component value, modified by the desaturation function 78. This modification of the color component values is preferably performed on the extended color gamut color values that have been encoded with the extended color gamut encoding function H(x) 77.

The desaturation coefficient s is determined from the color value in such a manner that the coefficient value is between 0.0 and 1.0. In addition, the value is lower for those color values that are most likely to produce color contouring or quantization. In other words, highlight color values having a relatively low saturation have a low desaturation coefficient s. The desaturation coefficient is computed considering the color value after the application of the inverse encoding function $G^{-1}(x)$ 56, (recall the color component values range between 0 and 1.0). The desaturation coefficient is preferably found as follows:

$$s = 1 - \alpha + \alpha \frac{m_o}{m_{max}} + \left[\alpha - \alpha \frac{m_o}{m_{max}}\right] f(sat)$$

where a is an overall adjustment factor for the desaturation effect. A value of $\alpha=0$ forces s=1.0, so there is no effect on the saturation of any color value. The preferred value of a is 0.7, although good results can be obtained with values from 0.5 to 0.85.

$m_o$ represents the slope of the modified inverse tone scale function $R_m^{-1}(x)$ 74 at a reference exposure. The slope of a function evaluated at a reference input can be determined by computing the ratio of the difference of the results from evaluating the function at two input values (nearby and on either side on the reference input) to the difference of the two input values. As a default, the reference slope $m_o$ of the modified inverse tone scale function at reference exposure of 0.855 is 1.32. The value of $m_o$ does not vary based on the values of the color components of a particular color value.

$m_{max}$ is the maximum of the slopes of the modified inverse tone scale function $R_m^{-1}(x)$ 74, evaluated at each the value of each color component of the color value. However, only color component values greater than an initial threshold To are considered. Preferably, $T_o=0.5$. The value of $m_{max}$ is forced to be at least equal to the value of $m_o$.

f(sat) is a weighting function based on the saturation of the color value. The value of sat is the sum of the absolute values of the differences between the value of each color component and the neutral, as expressed by the equation:

$$sat = \sum_{i=1}^{P} |N - c_i|$$

when the color components of the color value are red, green and blue (indicated with R, G, and B, respectively), $$sat = 1000(|N-R|+|N-G|+|N-B|)$$

where N is a color's neutral exposure value equal to (R+B+G)/3. (The 1000 is an arbitrary scale factor.)

Figure 13:
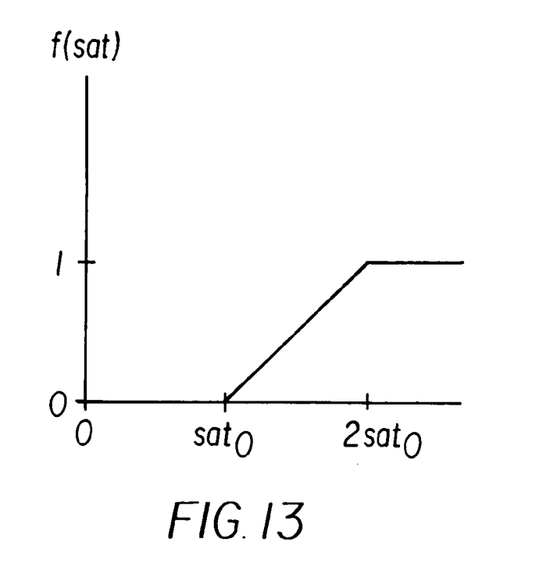
FIG. 13 is a plot of the function $f(\text{sat})$.

The preferable function f(sat) is shown in FIG. 13. For inputs less than $sat_o$, the value of f(sat)=0. Between $sat_o$ and $2*sat_o$, the value of f(sat) linearly increases to 1.0. When the saturation sat of a color value is greater than $2*sat_o$, the value of $f(sat_o)$ is 1.0, in turn causing the saturation scale factor s=1.0, resulting in no change in the value of the color components. The preferred value of $sat_o$ is recommended to be 100.

In summary, the desaturation function 78 reduces the saturation of color values that are likely to produce color contouring or saturation artifacts. This is accomplished by determining a saturation coefficient s individually for each color value in an image, and using that saturation coefficient to reduce the saturation of the color value. Highlight color values with medium or low levels of color saturation are subjected to a greater degree of desaturation in order to reduce the magnitude and frequency of objectionable color contouring and quantization artifacts. While the preferred method for determining the saturation coefficient has been described, those skilled in the art will recognize that many methods of finding the value of s may be used, without deviating from the spirit or scope of the invention.

The present invention describes a method by which a reconstructed extended gamut digital image can be formed from a limited color gamut digital image. The limited color gamut digital image is created by applying a color adjustment function to a first extended color gamut digital image. A reconstructed extended color gamut digital image can be formed by applying an inverse color adjustment function to the limited color gamut digital image, but the resulting image is likely to contain color contouring and quantization artifacts. The present invention describes a method by which the inverse color adjustment function is modified to form a modified inverse color adjustment function which, when applied to a limited color gamut digital image, results in a reconstructed extended color gamut digital image having fewer artifacts. Due to the modification of the inverse color adjustment function, the reconstructed extended color gamut digital image generally has color values with less color saturation for highlight (nearly white) pixels than corresponding pixels from the first extended color gamut digital image.

The present invention is preferably practiced in an image processing system including a source of digital images, such as a scanner or digital camera, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST first extended color gamut digital image
extended color gamut digital image
adjust color values to fit within limited color gamut step
color adjustment function
represent image in storage color space step
limited color gamut digital image
limited color gamut digital image
information describing color adjustment function
inverse color adjustment function
inverse encoding function $H^{-1}(x)$
color primary matrix E
tone scale function $R(x)$
encoding function $G(x)$
extended color gamut color value
limited color gamut color value
encoding function $H(x)$
inverse color primary matrix $E^{-1}$
inverse tone scale function $R^{-1}(x)$
inverse encoding function $G^{-1}(x)$
modify inverse color adjustment function step
modified inverse color adjustment function
reconstruct extended color gamut digital image step
reconstructed extended color gamut digital image
decontouring matrix D
modified inverse tone scale function $R_m^{-1}(x)$
inverse decontouring matrix $D^{-1}$
desaturation function
solid line showing the inverse tone scale function 54
dashed line showing a modified inverse tone scale function 74
dotted line showing a modified inverse tone scale function 74

What is claimed is:

1. A method for constructing an extended color gamut digital image from a limited color gamut digital image which was derived from a first extended color gamut image, comprising the steps of:
   a) providing a modified inverse color adjustment function which when such function operates on the limited color gamut digital image an extended color gamut digital image having reduced highlight color saturation for highlight color values when compared with corresponding color values of the first extended color gamut image is produced; and
   b) operating on the limited color gamut digital image with the modified inverse color adjustment function to construct the extended color gamut digital image with reduced color saturation for highlight color values that results in reduced levels of color contouring and quantization artifacts.

2. The method of claim 1 wherein the modified inverse color adjustment function is such that when such function is operated on a limited color gamut digital image an extended color gamut digital image having similar color saturation for non-highlight color values when compared with corresponding color values of the first extended color gamut digital image is produced.

3. The method of claim 2 wherein the first extended color gamut digital image is a digital image including color values representing light intensities of an original scene.

4. The method of claim 3 where the first extended color gamut digital image has a larger range of chroma values than the limited color gamut digital image.

5. The method of claim 2 wherein the first extended color gamut image is a digital image captured by a digital camera or scanned from a photographic film.

6. The method of claim 5 wherein the photographic film is print or transparency film.

7. The method of claim 2 wherein the modified inverse color adjustment function includes an inverse encoding function, an inverse tone scale function, or an inverse color primary matrix, or combinations thereof.

8. The method of claim 2 wherein the modified inverse color adjustment function includes a modified inverse tone scale function that is generated by modifying an inverse tone scale function.

9. The method of claim 8 wherein the modification of the inverse tone scale function includes the step of limiting the slope of the inverse tone scale function to a maximum value.

10. The method of claim 9 wherein the maximum value is between 3.0 and 10.0.

11. The method of claim 8 wherein the modified inverse color adjustment function includes a decontouring matrix that is applied to a color value prior to the modified inverse tone scale function and the inverse of the decontouring matrix is applied after the modified inverse tone scale function.

12. The method of claim 11 wherein each row of the decontouring matrix sums to a value between 0.95 and 1.05.

13. The method of claim 2 wherein the modified inverse color adjustment function includes a desaturation function that reduces the color saturation of color values likely to exhibit artifacts in the reconstructed extended color gamut digital image.

14. The method of claim 13 wherein the desaturation function determines a desaturation coefficient for each color value.

15. The method of claim 2 wherein the modified color adjustment function includes:
   a modified inverse tone scale function that is generated by modifying an inverse tone scale function;
   d) a decontouring matrix that is applied to a color value prior to the modified inverse tone scale function and the inverse of the decontouring matrix is applied after the modified inverse tone scale function; and
   e) a desaturation function that reduces the color saturation of color values likely to exhibit artifacts in the reconstructed extended color gamut digital image.

16. The method of claim 15 wherein the desaturation function determines a desaturation coefficient for each color value, the desaturation coefficient being a function of the local slope of the modified inverse tone scale function.

17. The method of claim 1 wherein the modified inverse color adjustment function is embodied in a 3D look-up table.

18. The method of claim 1 further including using the constructed extended color gamut digital image to provide a hard copy output.

19. The method of claim 1 further including using the constructed extended color gamut digital image to provide a display image.

20. The method of claim 1 wherein the limited color gamut digital image is provided by a digital camera.

21. The method of claim 1 wherein the limited color gamut digital image is represented in a color space of a particular device.

22. The method of claim 21 wherein the limited color gamut digital image is represented in a video RGB color space.

23. The method of claim 1 wherein the limited color gamut digital image is derived from the first extended color gamut image by applying a color adjustment function to the first extended color gamut digital image.

24. The method of claim 23 wherein the modified inverse color adjustment function is generated from information about the color adjustment function.

25. The method of claim 24 wherein the information about the color adjustment function is provided by a set of parameters describing the color adjustment function.

26. The method of claim 24 wherein the information about the color adjustment function is an identifier to indicate which color adjustment function from a set of standard color adjustment functions was used.

27. The method of claim 1 wherein highlight color values of the extended color gamut digital image have a smaller range of chroma values than highlight color values of the first extended color gamut digital image.

* * * * *